G. GOETZ.
AUTOMATIC WEIGHING AND RECORDING CAR SCALE.
APPLICATION FILED MAY 27, 1909.
1,001,635.
Patented Aug. 29, 1911.
2 SHEETS—SHEET 2.
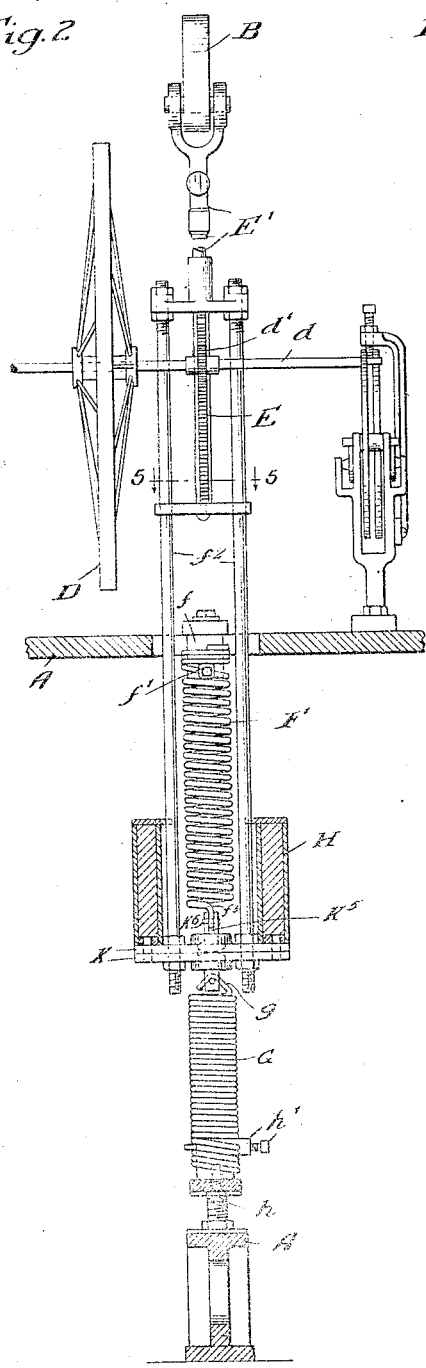
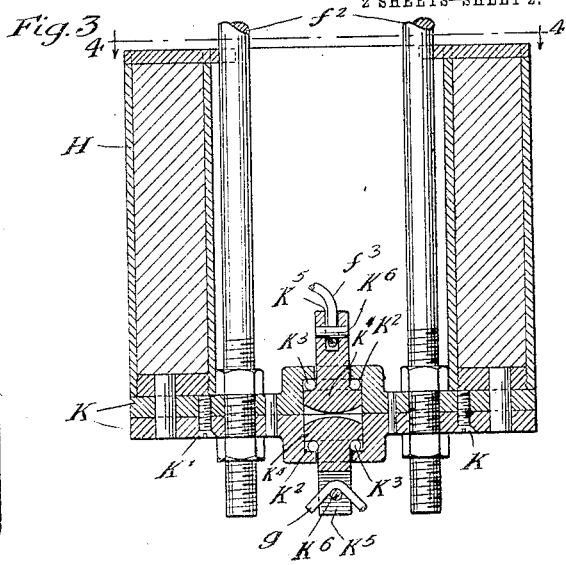
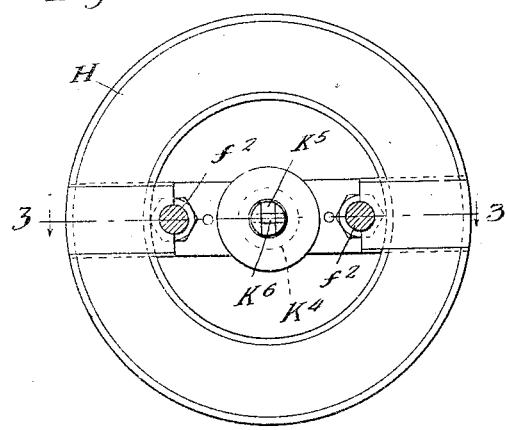
Witnesses:
Inventor:
George Goetz
By Munday, Evarts, Adcock & Clarke.
Attorneys

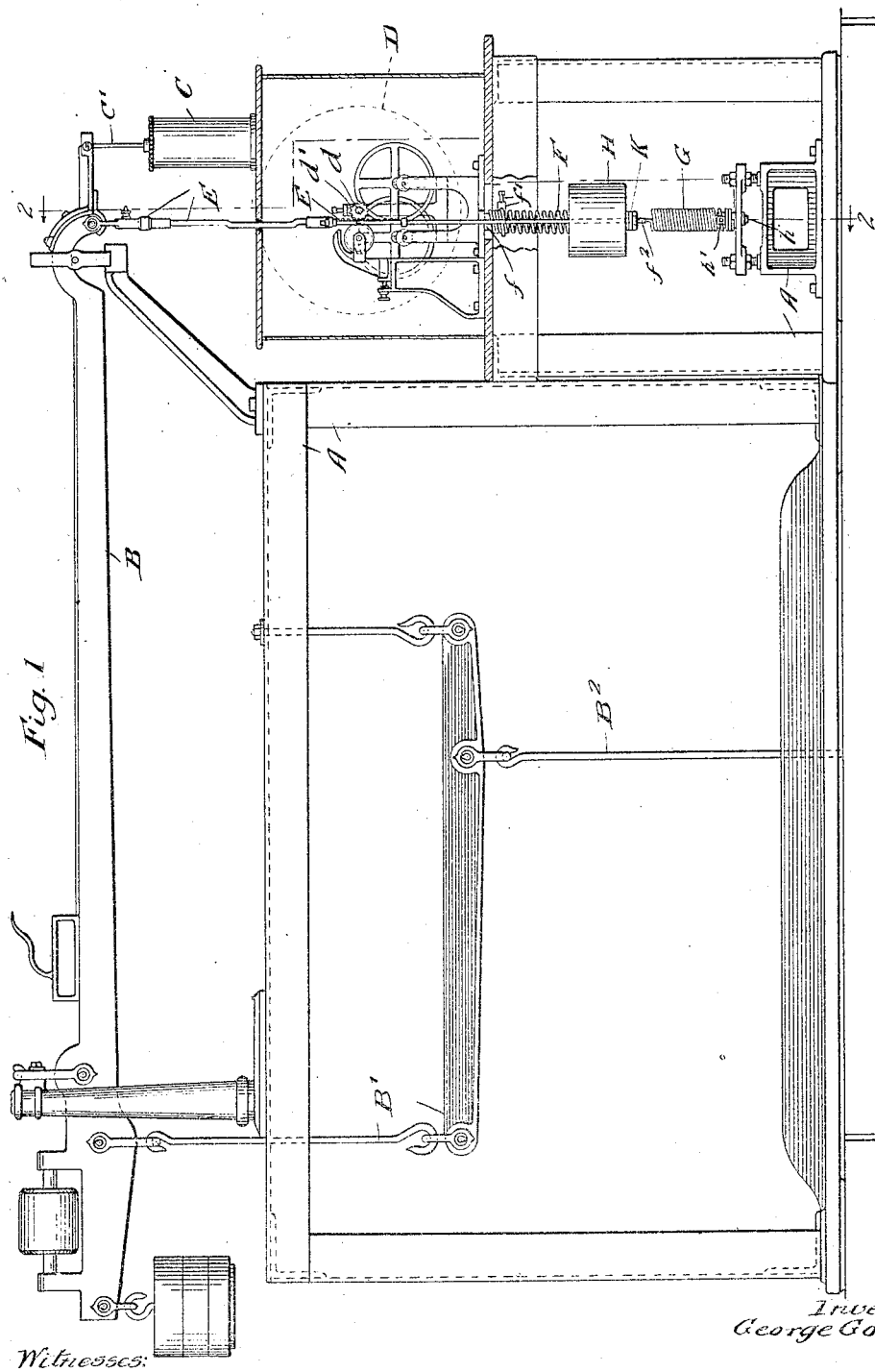

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

AUTOMATIC WEIGHING AND RECORDING CAR-SCALE.

1,001,635.  Specification of Letters Patent.  Patented Aug. 29, 1911.

Application filed May 27, 1909. Serial No. 498,779.

*To all whom it may concern:*

Be it known that I, GEORGE GOETZ, a citizen of the United States, residing in Chicago, in the county of Cook and State of Illinois, have invented a new and useful Improvement in Automatic Weighing and Recording Car-Scales, of which the following is a specification.

My invention relates to scales for automatically weighing and recording weights of cars, and more particularly to improvements upon the automatic weighing and recording car scales of my Patents Nos. 651,845, 778,358 and 778,359. In the weighing and recording car scales of my said prior patents, the scale beam is connected with a counterbalance spring through a rack bar, the teeth of which mesh with a gear on the printing wheel shaft and thus turns the printing wheel to the position for recording the true weight of the car on the scale platform; and heretofore in practical operation, very slight changes in temperature by expansion or contraction of the spring cause substantial inaccuracies in the operation of the weighing and recording mechanism as a very slight or infinitesimal movement of the rack bar represents a variation in weight of the car of many pounds. And as a consequence, for accurate weighing, the connection between the counterbalance spring and rack bar requires frequent adjustment to compensate for changes of temperature during the day as well as for different seasons of the year.

The object of my invention is to provide a simple, efficient and reliable means for obviating this defect in operation. This object or result I accomplish, and herein my invention consists, by coöperatively combining with the scale beam, printing wheel, rack and gear, a compensating spring and compensating weight interposed in the connection between the counterbalance spring and rack bar in such manner that the compensating weight maintains the counterbalance spring initially extended under the normal load of say, sixteen pounds, which the counterbalance spring exerts when the scale is weighing its full capacity load; so that any variation or contraction or elongation by changes of temperature of the counterbalance spring will be fully counteracted by a corresponding variation, contraction or elongation in the compensating spring. The compensating spring is connected at its lower end to the frame or stationary support and at its upper end to the counterbalance spring, and the middle point or line between the two springs thus remains constantly on the same level or stationary, whatever variations in temperature may occur; as any temperature contraction of the lower spring tends to pull the compensating weight down, while the corresponding temperature contraction of the upper spring tends to pull the compensating weight upward by an equal amount; thus always maintaining the compensating weight at the same level or point; and the action is precisely the same but the reverse when a temperature elongation or expansion of the springs occurs.

My invention also consists in the novel construction of parts and devices and in the novel combinations of parts and devices herein shown and described and more particularly specified in the claims.

In the accompanying drawing forming a part of this specification, I have only shown those portions of my car weighing and recording scale to which my present improvements particularly relate, and I would refer to the specification and drawings of my said prior patents for a full description of the construction and operation of the other portions of the apparatus, such other portions being preferably constructed substantially in accordance with the specification and drawings of one or the other of my said prior patents.

In said drawing, Figure 1 is a side elevation partly in vertical section of a weighing and recording car scale embodying my invention, showing, however, only that portion of the complete apparatus to which my invention relates. Fig. 2 is a front elevation, partly in vertical section on line 2—2 of Fig. 1. Fig. 3 is a detail section on line 3—3 of Fig. 4. Fig. 4 is a detail horizontal section on line 4—4 of Fig. 3 and Fig. 5 is a detail horizontal section on line 5—5 of Fig. 2.

In the drawing, A represents the frame of the weighing and recording car scale, B the scale beam connected with the scale platform through customary connecting links and levers B¹ B². C is the dash-pot, the piston stem C¹ of which is connected with the scale beam. D is the printing or recording wheel, the shaft $d$ of which is furnished with a gear $d^1$ which meshes with the rack E having connections $E^1$ with the scale beam. F is the counterbalance spring having a connection $f$ at one end with the stationary frame A, and provided with an adjusting device $f^1$ for cutting out or forcing solid one or more coils of the spring to vary its length as may be required, and connected at its other end by suitable connections or rods $f^2$ with the scale beam B, preferably through the rack E. All these parts are or may be of any suitable construction and need no further description, being preferably constructed and operating substantially in accordance with one or the other of my said prior patents.

G is the compensating spring and H the compensating weight which holds the counterbalance spring extended under an initial load or tension, preferably substantially that which the counterbalance spring exerts when under maximum tension or when weighing the full capacity of the scale. That is to say, if the counterbalance spring F exerts a tension of sixteen pounds against the end of the scale beam when weighing the maximum load or full capacity of the scale, the compensating weight is also preferably sixteen pounds, and thus holds or maintains the counterbalance spring F extended under an initial tension of sixteen pounds. The compensating spring G is connected at one end to the frame A, or other stationary support, preferably by a bolt $h$, and it is provided with a cut-out or adjusting device $h^1$ to enable one or more of its coils to be cut out or forced solid, this cut out device $h^1$ being preferably similar in construction and operation to the cut out or adjusting device $f^1$ employed in the counterbalance spring F. At their meeting ends, the counterbalance spring F and compensating spring G are preferably connected together by means of a pair of connecting plates K K secured together by screws $K^1$, and provided each with a ball bearing socket or race $K^2$, furnished with balls $K^3$ and a rotatable coupling head $K^4$ having a slot $K^5$ and pin $K^6$ for connection with the bent or hooked ends $f^3$ $g$ of the springs F, G. This ball bearing connection between the ends of the springs enables the springs to freely turn without binding as the springs contract or expand under changes of temperature.

I claim:—

1. The combination with a scale beam, of a counterbalance spring connected thereto, and a compensating spring and a compensating weight, holding the counterbalance spring under an initial tension, and ball bearing connections between the meeting ends of said springs, substantially as specified.

2. The combination with a scale beam, of a counterbalance spring connected thereto, and a compensating spring and a compensating weight, holding the counterbalance spring under an initial tension, a pair of connecting plates between the meeting ends of said springs and a pair of coupling heads for coupling said springs to said connecting plates, substantially as specified.

3. The combination with a scale beam, of a counterbalance spring connected thereto, and a compensating spring and a compensating weight, holding the counterbalance spring under an initial tension, a pair of connecting plates between the meeting ends of said springs and a pair of coupling heads for coupling said springs to said connecting plates, said coupling heads and plates having ball bearings, substantially as specified.

GEORGE GOETZ.

Witnesses:
 PEARL ABRAMS,
 H. M. MUNDAY.